A. HAMILTON.
Carriage-Brake.

No. 51,585. Patented Dec. 19, 1865.

Witnesses:
Alex. A. C. Klauckes
W. F. Hall.

Inventor:
Alex. Hamilton
By Attorneys

UNITED STATES PATENT OFFICE.

ALEXANDER HAMILTON, OF WASHINGTON, DISTRICT OF COLUMBIA.

IMPROVED WAGON-SHOE LOCK.

Specification forming part of Letters Patent No. 51,585, dated December 19, 1865.

*To all whom it may concern:*

Be it known that I, ALEXANDER HAMILTON, of Washington, in the District of Columbia, have invented a new and useful Wagon-Shoe Lock; and I do hereby declare the following to be a full, clear, and exact description of the nature, operation, and construction of the same, sufficient to enable one skilled in the art to which it appertains to construct and use the same, reference being had to the accompanying drawings, which are made part of this specification, and in which—

Figure 1:
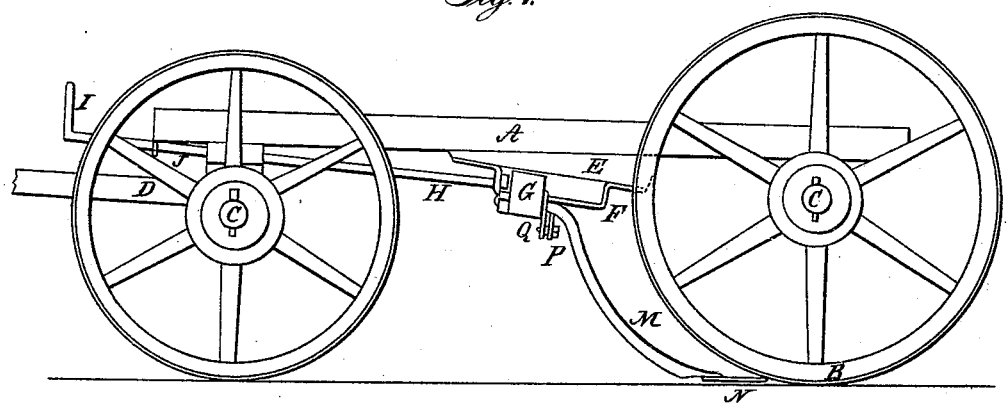
Figure 2:
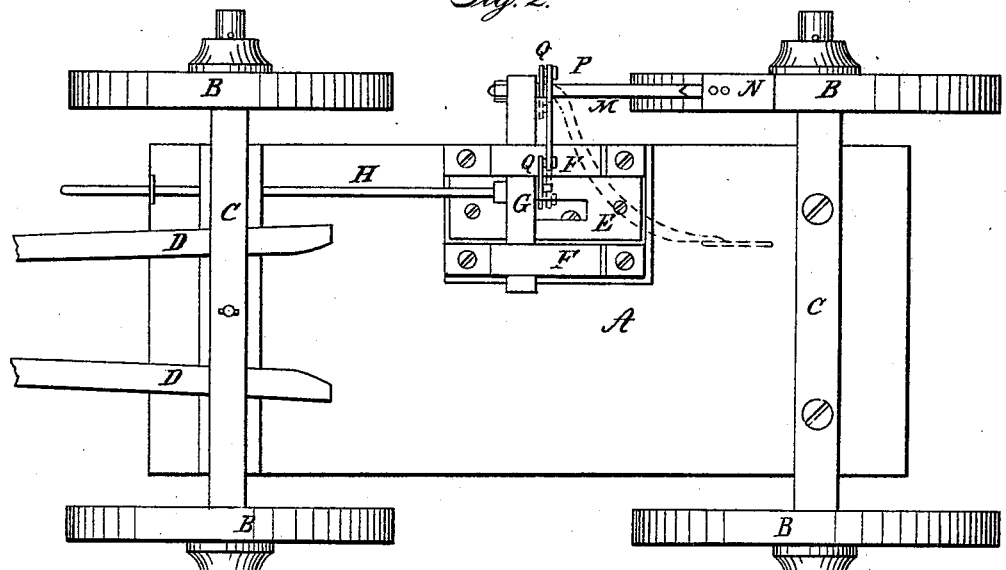
Figure 4:
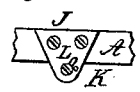
Figure 3:
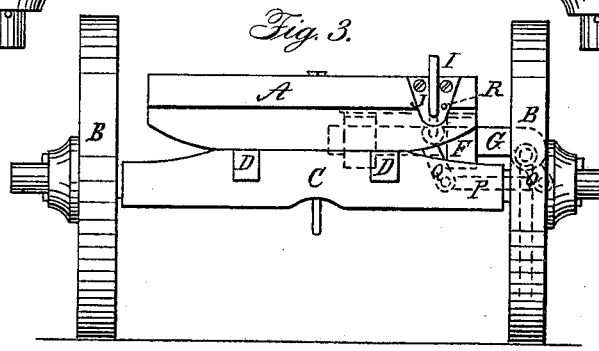

Figure 1 is a side elevation. Fig. 2 is a view of the under side of the wagon. Fig. 3 is a front elevation. Fig. 4 is a detached view of the plate on the front end of the wagon-bed, and through which the handle of the lock passes.

The object of the invention is to provide a means of locking one of the hinder wheels of a wagon while descending a hill without subjecting the said wheel to the strain incident to chain-locking, in which the wheel, being prevented from rotating, is caused to rub upon the ground. The injurious effect of this upon the whole structure of the wheel and axle is evident. The spindle of the axle is strained, the spokes are jerked loose in the hub, and the fellies strained and twisted upon the spokes. The tire, also, is torn loose from the fellies, and is violently abraded by frictional contact with the earth. The chain is an effective but exceedingly clumsy mechanical expedient, and the old wagon-shoe, which was attached by a chain to the bed, and in which the wheel rode in descending hills, required manipulation at the top and bottom of the hill by the dismounted driver.

In my improvement a shoe is furnished which is operated by a handle on the bed, and on which the wheel rides in safety as long as required, the same being withdrawn and retracted to its position under the wagon as soon as its temporary use is passed.

In the drawings, A represents the wagon-bed, B the wheels, C the axle, D the handles. On the under side of the bed is a block, E, to which are fastened loops F, in which is a sliding bar, G, which has a motion slightly inclined to the level of the bed when moved back and forth by the rod H and bent portion or handle I. The rod H is attached to the bar G, to which latter is also bolted the bent rod M, which terminates in the shoe N. In addition to the forward and back motion which the rod and shoe M N receive as the bar G is moved in the loops F, the rod M has a rotary movement by means of the crank-arms O Q, which are respectively attached to the rods M and H and the link P, which connects the said crank-arms and communicates the rotary motion of the rod H and handle I to the rod and shoe M N. The position of the handle is retained by means of the small lug $k$, Fig. 4, on the rod H, which, when the shoe is in its lower position, passes through the orifice L in the plate J, and when the shoe is elevated, as shown in red lines in Fig. 2, enters the hole R, Fig. 3.

When it is desired to lock the wagon-wheel, detach the lug $k$ from the hole R by drawing the handle slightly forward; then rotate the handle to the upright position, which brings the shoe to the ground; then push the handle back, when the lug $k$, passing through the orifice L, and the rod H, pushing back the bar G in the loops F, bring the shoe back to the point where the wheel runs onto it, and the friction brings it back as far as the loops will permit. The reverse motion will restore it to its former position.

In case of accident to the near hind wheel the shoe may be made to support that corner of the empty or lightly loaded wagon, or if it be the other wheel the sound one can be placed on the off side and the wagon move upon three wheels and the shoe.

Having described my invention, what I claim therein as new, and desire to secure by Letters Patent, is—

1. The combination of the rods and levers described, by which the circular and rectilinear motion is given to the shoe-bar for the purpose of bringing the shoe to the required position.

2. The rod H, lug $k$, and the perforated plate J, arranged and operated substantially as described.

ALEX. HAMILTON.

Witnesses:
OCTAVIUS KNIGHT,
W. F. HALL.